United States Patent
Haase et al.

(10) Patent No.: US 9,698,436 B2
(45) Date of Patent: Jul. 4, 2017

(54) OPERATING METHOD FOR A FUEL CELL SYSTEM

(71) Applicant: Bayerische Motoren Werke Aktiengesellschaft, Munich (DE)

(72) Inventors: Stefan Haase, Munich (DE); Marcel Sterzenbach, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/062,458

(22) Filed: Mar. 7, 2016

(65) Prior Publication Data

US 2016/0190617 A1 Jun. 30, 2016

Related U.S. Application Data

(63) Continuation of application No. PCT/EP2014/068300, filed on Aug. 28, 2014.

(30) Foreign Application Priority Data

Sep. 24, 2013 (DE) .................. 10 2013 219 209

(51) Int. Cl.
*H01M 8/04746* (2016.01)
*H01M 8/04014* (2016.01)
(Continued)

(52) U.S. Cl.
CPC ......... *H01M 8/04761* (2013.01); *B60L 1/003* (2013.01); *B60L 1/02* (2013.01);
(Continued)

(58) Field of Classification Search
None
See application file for complete search history.

(56) References Cited

U.S. PATENT DOCUMENTS

2004/0219408 A1 11/2004 Hesse
2008/0196956 A1 8/2008 Koenekamp et al.
(Continued)

FOREIGN PATENT DOCUMENTS

DE 101 01 914 A1 7/2002
DE 10 2008 009 118 A1 9/2008
(Continued)

OTHER PUBLICATIONS

International Search Report (PCT/ISA/210) issued in PCT/EP2014/068300 dated Nov. 21, 2014 with English translation (five pages).
(Continued)

*Primary Examiner* — Yoshitoshi Takeuchi
(74) *Attorney, Agent, or Firm* — Crowell & Moring LLP

(57) ABSTRACT

An operating method is provided for a fuel cell system with a radiator structure which is flowed through by ambient air and a fuel cell stack, at least part of the outgoing air flow of the fuel cell stack can be guided onto the radiator structure such that, at the radiator structure, the guided outgoing air flow causes an increase in mass flow of the ambient air through the radiator structure according to the jet pump principle. At least part of the outgoing air flow of the fuel cell stack can be guided through a gas expansion machine. The division of energy which is contained in the outgoing air flow and can be recovered in the gas expansion machine and/or at the radiator structure according to the jet pump principle is changed by an electronic control unit in a manner which is adapted to boundary conditions. This division is set and changed, in particular, using the temperature of the medium to be cooled in the radiator structure and the required electrical power of the fuel cell stack, by the pressure drop in the gas expansion machine being set by targeted setting of the flow conditions prevailing therein and/or the magnitude of the outgoing air flow which is
(Continued)

guided through the gas expansion machine being set via a controllable bypass of the gas expansion machine.

9 Claims, 2 Drawing Sheets

(51) Int. Cl.
*H01M 8/04007* (2016.01)
*B60L 1/00* (2006.01)
*B60L 1/02* (2006.01)
*B60L 3/00* (2006.01)
*B60L 11/18* (2006.01)
*B60L 15/20* (2006.01)

(52) U.S. Cl.
CPC ......... *B60L 3/0053* (2013.01); *B60L 11/1883* (2013.01); *B60L 11/1892* (2013.01); *B60L 11/1898* (2013.01); *B60L 15/20* (2013.01); *H01M 8/04014* (2013.01); *H01M 8/04074* (2013.01); *B60L 2240/12* (2013.01); *B60L 2240/36* (2013.01); *B60L 2240/622* (2013.01); *B60L 2240/642* (2013.01); *B60L 2240/662* (2013.01); *B60L 2260/50* (2013.01); *B60L 2260/54* (2013.01); *B60L 2260/56* (2013.01); *H01M 2250/20* (2013.01); *H01M 2250/40* (2013.01); *H01M 2250/402* (2013.01); *Y02B 90/12* (2013.01); *Y02E 60/56* (2013.01); *Y02T 10/645* (2013.01); *Y02T 10/72* (2013.01); *Y02T 10/7275* (2013.01); *Y02T 10/7291* (2013.01); *Y02T 90/16* (2013.01); *Y02T 90/162* (2013.01); *Y02T 90/32* (2013.01); *Y02T 90/34* (2013.01)

(56) References Cited

U.S. PATENT DOCUMENTS

| | | | |
|---|---|---|---|
| 2013/0139997 | A1 | 6/2013 | Murakami et al. |
| 2015/0111123 | A1 | 4/2015 | Haase et al. |

FOREIGN PATENT DOCUMENTS

| | | | |
|---|---|---|---|
| DE | 10 2008 029 529 | A1 | 10/2009 |
| DE | 11 2009 003 549 | T5 | 9/2012 |
| DE | 10 2011 122 306 | A1 | 6/2013 |
| DE | 10 2012 211 421 | A1 | 5/2014 |
| DE | 10 2013 214 602 | A1 | 1/2015 |
| WO | WO 2010/066462 | A1 | 6/2010 |

OTHER PUBLICATIONS

German-language Written Opinion (PCT/ISA/237) issued in PCT/EP2014/068300 dated Nov. 21, 2014 (five pages).

German Search Report issued in counterpart German Application No. 10 2013 219 209.6 dated Feb. 18, 2014 with partial English translation (10 pages).

OPERATING METHOD FOR A FUEL CELL SYSTEM

CROSS REFERENCE TO RELATED APPLICATIONS

This application is a continuation of PCT International Application No. PCT/EP2014/068300, filed Aug. 28, 2014, which claims priority under 35 U.S.C. §119 from German Patent Application No. 10 2013 219 209.6, filed Sep. 24, 2013, the entire disclosures of which are herein expressly incorporated by reference.

BACKGROUND AND SUMMARY OF THE INVENTION

The invention relates to an operating method for a fuel cell system with a radiator structure flowed through by ambient air and a fuel cell stack, at least part of the outgoing air flow of which can be guided onto the radiator structure in such a way that, at the radiator structure, the guided outgoing air flow causes an increase in the mass flow of the ambient air through the radiator structure according to the jet pump principle.

A corresponding outgoing air guiding of a fuel cell stack is described in German patent applications having official file reference numbers 102012211421.1 (U.S. application Ser. No. 14/587,071) and 102013214602.7 (U.S. application Ser. No. 15/001,402). Such an outgoing air routing utilizes a part of the energy contained in the fuel cell outgoing air flow for delivering ambient air through a so-called radiator structure. The radiator structure is provided, in particular, for cooling the fuel cells of the fuel cell stack in the fuel cell system.

It is known, furthermore, that part of the energy which is contained in particular in the form of positive pressure in the outgoing air flow of a fuel cell or of a fuel cell stack can be recovered in a turbine or another so-called expander, wherein for this purpose reference is merely exemplarily made to DE 10 2011 122 306 A1. Such an expander or the like is described as a gas expansion machine here, seeing that therein the outgoing air flow exiting the fuel cell stack with a certain pressure is subjected in particular to a pressure reduction or said certain pressure is utilized for driving the turbine or similar device (gas expansion machine).

The aim here is to show how the energy contained in the outgoing air flow can be utilized even better in as favorable as possible a manner.

The solution to this object consists in an operating method for a fuel cell system with a radiator structure flowed through by ambient air and a fuel cell stack, at least part of the outgoing air flow of which can be guided onto the radiator structure in such a way that, at the radiator structure, the guided outgoing air flow causes an increase in the mass flow of the ambient air through the radiator structure according to the jet pump principle. At least part of the outgoing air flow of the fuel cell stack can be guided through a gas expansion machine and the division of the energy, which is contained in the outgoing air flow and can be recovered in the gas expansion machine and/or at the radiator structure according to the jet pump principle, is changed by an electronic control unit in a manner that is adapted to boundary conditions. Advantageous further developments are described herein.

According to the invention, different possibilities for recovering the energy contained in the outgoing air flow of a fuel cell are provided and a targeted division of the energy recovery over these different possibilities takes place namely (as generally known) over a gas expansion machine on the one hand and over the possibility of increasingly delivering ambient air through the mentioned radiator structure by way of the jet pump principle on the other hand. Before boundary conditions or aspects under which the division of the energy recovery specifically takes place are explained in more detail, it is initially explained how this division, as such, can be carried out in the first place.

Accordingly, the outgoing air flow of the fuel cell stack can be initially guided completely through the gas expansion machine and subsequently, as described in the patent applications mentioned at the outset, guided up to (or into) a radiator structure in order to bring about an increase of the mass flow of the ambient air through said radiator structure according to the jet pump principle. The guiding onto the radiator structure is thus located downstream of the gas expansion machine. The amount of energy that is now first removed in the gas expansion machine (and is thus no longer available for the utilization of the jet pump principle) can be determined through targeted adjusting of the flow conditions prevailing in the gas expansion machine, i.e. the pressure drop in the gas expansion machine is specifically adjusted for example by way of adjustable guide blades in a turbine (or the like). Alternatively, the gas expansion machine can be supplied with only a (first) part of the fuel cell outgoing air flow while the other (second) part of the fuel cell outgoing air flow is guided directly to the radiator structure in order to create (preferentially, again united beforehand with the air flow exiting the gas expansion machine) according to the jet pump principle the pressure drop which also delivers ambient air through the radiator structure. Obviously, a combination of these two stated alternatives is also possible.

As far as the boundary conditions are now concerned, by way of which an electronic control unit performs the division, according to the invention, of the energy recovery from the fuel cell outgoing air flow over the gas expansion machine on the one hand and the radiator structure on the other hand (here and in the following merely the term "radiator structure" is used for the sake of simplicity for guiding the fuel cell outgoing air flow onto the radiator structure in such a way that the same according to the jet pump principle brings about an increase of the mass flow of the ambient air through the radiator structure), the electronic control unit, measured directly or indirectly, takes into account in particular the temperature of the medium to be cooled in the radiator structure (="coolant") and thus practically the radiator output requirement of the fuel cell system. Here, in addition to or instead of the currently measured temperature (either of the medium to be cooled or of the radiator structure itself), a temperature that is estimated by calculation using suitable data and expected in the foreseeable future can also be taken into account. Directly or indirectly, the current electrical output of the fuel cell stack and/or the electrical current to be demanded in a foreseeable period of time can also be taken into account since the same does not only permit drawing conclusions regarding the current temperature conditions but also temperature conditions to be expected in a foreseeable period of time.

In the case of a fuel cell system according to the invention installed in a motor vehicle, the previously mentioned boundary conditions of an electronic system control unit are usually known. It is proposed to furthermore take into account the ambient temperature and/or the traveling speed of the vehicle equipped with the fuel cell system for the division. Obviously, the current pressure drop in the fuel cell outgoing air flow at the gas expansion machine can or should also be directly or indirectly included, preferentially in the form of a suitable proxy, in the calculations performed in the electronic control unit.

As already mentioned, the electronic control unit controls or regulates, as part of carrying out the operating method according to the invention, primarily the pressure drop of the fuel cell outgoing air flow at the gas expansion machine in a motor vehicle with a liquid-cooled fuel cell stack with the help, inter alia, of (i) the temperature of the cooling circuit of the fuel cell system, (ii) the traveling speed of the motor vehicle, (iii) the demanded output of the vehicle or of the fuel cell system, and (iv) the current pressure drop at the gas expansion machine. In particular with respect to the demanded output of the motor vehicle, a forward-looking calculation, for example with the help of GPS data, for example for an imminent uphill drive, can be conducted here. When subsequently an increase of the coolant temperature or of the expected coolant temperature over a predetermined limit value is present, the energy recovery in the gas expansion machine that is practically carried out up to that time is reduced, which results in a lowering of the system efficiency but simultaneously brings about a higher cooling output. Thus, a higher output of the fuel cell stack can be achieved inter alia at high ambient temperatures, in the case of high output requirements and at low traveling speed of the vehicle (for example when traveling uphill). When, by contrast, the cooling output requirement of the fuel cell system is low and no quasi additional cooling output worth mentioning is thus needed, the maximum energy recovery preferentially takes place from the fuel cell outgoing air flow in the gas expansion machine, wherein the latter applies generally—and thus not only for a fuel cell system installed in a motor vehicle.

Coming back to the use in a motor vehicle, it can thus be calculated in advance from the current vehicle speed and the output requirement from route data available in typical navigation systems or assumptions regarding the further traveling operation how the cooling requirement in general or in the case of a liquid-cooled fuel cell system the coolant temperature will develop in the future. When a temperature above a set maximum temperature is expected, the pressure drop at the gas expansion machine is already prophylactically reduced and a greater component of the energy recovery from the fuel cell outgoing air flow is supplied to the radiator structure as described above, i.e. the outgoing air flow is guided onto the radiator structure in such a way that the same at the radiator structure brings about an increase of the mass flow of ambient air through the radiator structure according to the jet pump principle.

When, by contrast, the vehicle is braked, a lower cooling requirement is to be expected and a larger component of the energy contained in the fuel cell outgoing air flow, preferentially in the form of a larger component of the fuel cell outgoing air flow itself, is supplied to the gas expansion machine in order to thereby increase the overall efficiency of the fuel cell system. However, the preconditioning of the cooling system of the fuel cell system or of the coolant of the (liquid-cooled) fuel cell stack for example for an imminent acceleration process of the vehicle should have priority.

It can be provided, furthermore, that in terms of an optimization of the system efficiency, the output requirement of a fan which, as is quite usual, delivers ambient air through the radiator structure is taken into account in the calculations of the electronic control unit and suitably adjusted, i.e. adjusted according to the boundary conditions and the outgoing air quantity currently guided onto the radiator structure according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
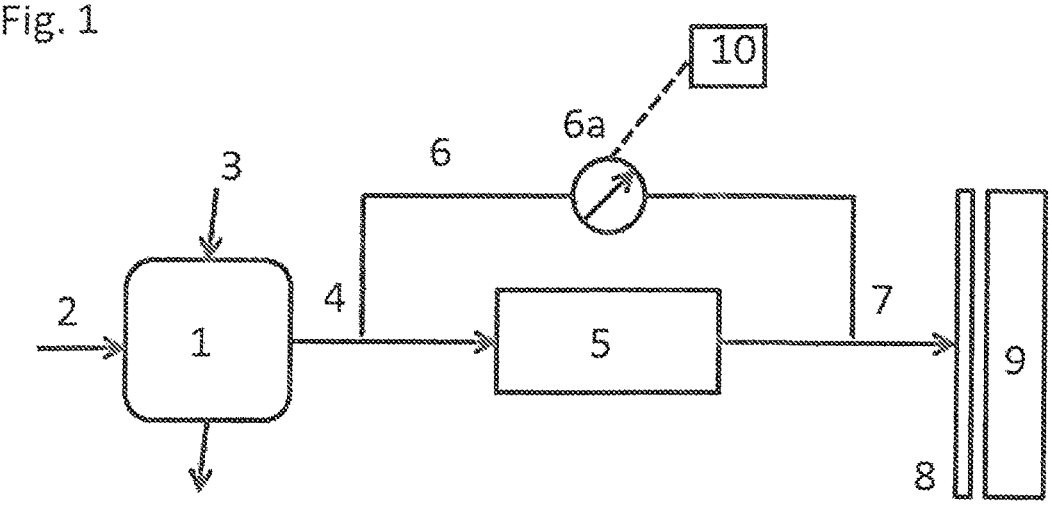
FIG. 1 is a mechanical circuit diagram illustrating an exemplary embodiment of an arrangement of components employed in carrying out the method according to the invention.
Figure 2:
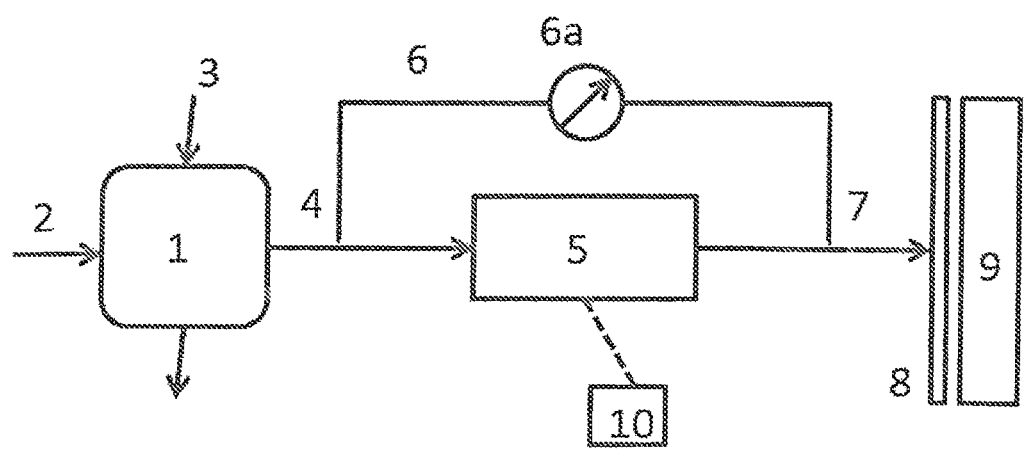
FIG. 2 is a mechanical circuit diagram of another exemplary embodiment of the arrangement of components employed in carrying out the method according to the invention.

In FIGS. 1 and 2, a fuel cell stack (=stack of fuel cells) is marked with the reference number 1. In addition to ambient air indicated by arrow 2, the fuel cell stack 1 is supplied with hydrogen, as indicated by arrow 3, as usual for combustion. The outgoing air flow of the fuel cell stack that remains after the combustion of the hydrogen 3 with the supplied ambient air 2 carries the reference number 4. This outgoing air flow 4, which because of the delivery of the ambient air 2 into the fuel cell stack 1 by a compressor or similar device has a higher pressure than the ambient air pressure, is fed to a gas expansion machine 5 for the partial recovery of the energy contained in the outgoing airflow 4. Alternatively, the outgoing air flow 4 can bypass the gas expansion machine 5 in a bypass 6 as a function of the degree of opening of a bypass valve 6a. Downstream of the gas expansion machine 5, the outgoing air partial flow exiting from the same is united with the outgoing air partial flow that flows through the bypass 6 and thereafter reaches a distributor pipe 8 as outgoing air flow 7. Out of the distribution pipe 8, the outgoing air flow exits before or at a radiator structure 9 such that the outgoing air flow 7, according to the jet pump principle, brings about an increase of the mass flow of ambient air through the radiator structure 9. Specifically, the radiator structure 9 is an air-coolant heat exchanger, in which a circulated coolant of the liquid-cooled fuel cell stack 1 is re-cooled.

In FIG. 1, an electronic control unit 10 controls exclusively the degree of opening of the bypass valve 6a and thus the division of the energy recovery from the outgoing air flow 4 between the gas expansion machine 5, on the one hand, and the radiator structure 9, on which the outgoing air flow 7 brings about an increase of the ambient air flow flowing through the radiator structure 9, on the other hand. According to FIG. 2, the electronic control unit additionally controls the pressure drop in the gas expansion machine, for example via adjusting the guide blades of a turbine.

Figure 3:
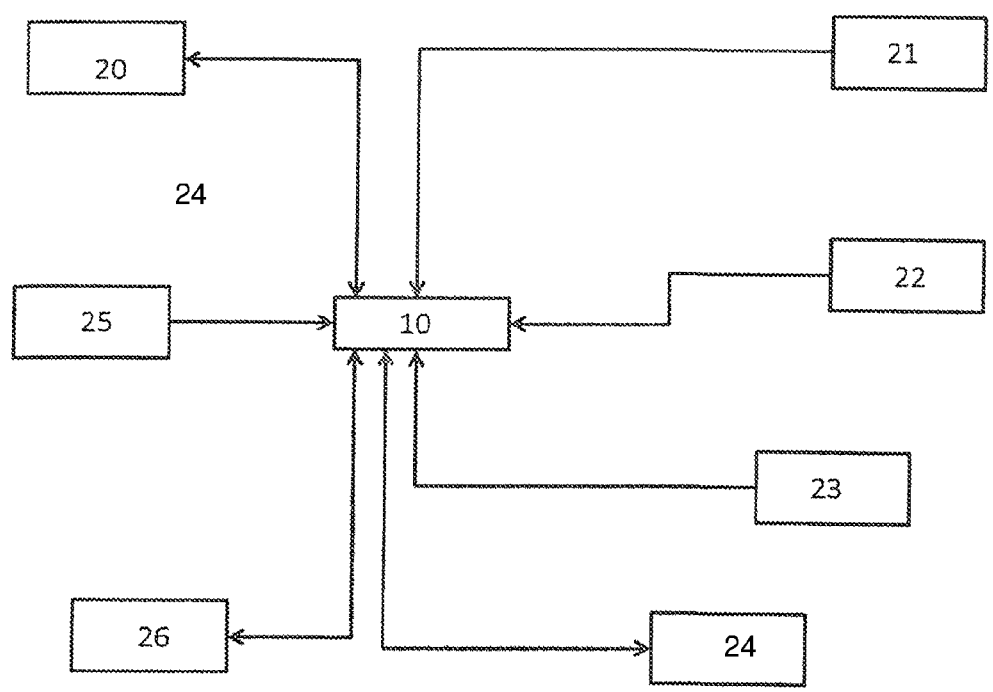
FIG. 3 is a functional diagram illustrating signals processed by an electronic control unit as well as signal generators and signal receivers.

FIG. 3 is an exemplary diagram showing the control variables or signals which the electronic control unit 10 processes, i.e. receives (the respective arrow is only directed towards the control unit 10) or is able to transmit (the respective arrow is also directed from the control unit 10 to the respective element, i.e. goes in both directions).

Here, the reference number 20 stands for an element for adjusting the magnitude of the ambient air flow 2 fed to the fuel cell stack 1. The reference number 21 stands for the measurement of the temperature of the coolant of the fuel cell stack 1 to be re-cooled in the radiator structure 9. The reference number 22 stands for the output requirement on the fuel cell stack 1 or through the vehicle with the fuel cell system, respectively. The reference number 23 stands for the traveling speed of the vehicle, from which the magnitude of the ambient air flow flowing through the radiator structure 9 without the help of the fuel cell outgoing air flow 7 can be as determined, wherein this radiator structure 9 is substantially arranged as usual in the front region of the vehicle. An adjusting unit that is provided, if appropriate, is marked with the reference number 24, by which the flow velocity and/or flow direction of the outgoing air flow 7 exiting from the distributor pipe 8 can be changed with respect to the radiator structure 9. This is briefly described in the two German patent applications mentioned at the outset, in which the adjusting unit may be in the form of a slide or the like. The reference number 25 marks a suitable control element with the help of which the electronic control unit 10 can perform the division of the energy recovery from the outgoing air flow 4 between the gas expansion machine 5 on the one hand and the radiator structure 9, at which the outgoing air flow 7 brings about an increase of the ambient air flow flowing through the radiator structure 9, on the other hand. For example, this control element 25 can be the bypass valve 6*a* shown in FIG. 1, 2. Alternatively (or additionally), the control element 25 can be an adjusting apparatus on the gas expansion machine 5, with the help of which the pressure drop in the same can be changed, for example in the form of adjustable guide blades on a gas expansion machine embodied as a turbine. Optionally, a measurement device 26 is provided for measuring the pressure acting on the ambient air on the radiator structure 9 and to be delivered through the radiator structure 9 according to the jet pump principle, said pressure being caused through the fuel cell outgoing air flow 7 appropriately guided up to the radiator structure 9.

Altogether, an improved cooling of the fuel cell stack 1 is possible with the presented operating method, which is advantageous in numerous aspects.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a fuel cell system having a fuel cell stack and a radiator structure, wherein ambient air flows through the radiator structure, the method comprising the acts of:

guiding at least part of outgoing air flow of the fuel cell stack onto the radiator structure such that, at the radiator structure, the guided outgoing air flow causes an increase in mass flow of the ambient air through the radiator structure according to a jet pump principle;

guiding at least part of the outgoing air flow from the fuel cell stack through a gas expansion machine; and changing, via an electronic control unit, a division of energy contained in the outgoing air flow and recoverable in the gas expansion machine and/or at the radiator structure per the jet pump principle, wherein the changing of the division of the energy is performed in a manner adapted to boundary conditions.

2. The method according to claim 1, wherein the act of changing the division of energy is performed based on a current temperature and/or a temperature to be expected in a foreseeable time period of a medium to be cooled in the radiator structure and based on a current electrical output of the fuel cell stack and/or an electrical output to be demanded in a foreseeable time period.

3. The method according to claim 2, wherein an ambient temperature and/or a traveling speed of a vehicle equipped with the fuel cell system is factored into account in changing the division of energy.

4. The method according to claim 3, wherein an output requirement of a fan that delivers ambient air through the radiator structure is factored into account and adjusted.

5. The method according to claim 4, wherein the act of changing the division of energy is carried out by adjusting a pressure drop in the gas expansion machine via a targeted adjustment of flow conditions prevailing in the gas expansion machine.

6. The method according to claim 1, wherein an ambient temperature and/or a traveling speed of a vehicle equipped with the fuel cell system is factored into account in changing the division of energy.

7. The method according to claim 1, wherein an output requirement of a fan that delivers ambient air through the radiator structure is factored into account and adjusted.

8. The method according to claim 1, wherein a magnitude of the outgoing air flow guided through the gas expansion machine is adjusted via a regulatable bypass of the gas expansion machine.

9. The method according to claim 1, wherein the act of changing the division of energy is carried out by adjusting a pressure drop in the gas expansion machine via a targeted adjustment of flow conditions prevailing in the gas expansion machine.

* * * * *